US010626058B2

(12) United States Patent
Colpaert et al.

(10) Patent No.: US 10,626,058 B2
(45) Date of Patent: Apr. 21, 2020

(54) UREA AMMONIUM SULPHATE-BASED COMPOSITION AND METHOD FOR THE MANUFACTURE THEREOF

(71) Applicant: YARA INTERNATIONAL ASA, Oslo (NO)

(72) Inventors: Filip Colpaert, Zwijnaarde (BE); Francois Ledoux, Cormeilles en Parisis (FR); Ruud Van Belzen, Middelberg (NL)

(73) Assignee: Yara International ASA, Oslo (NO)

( * ) Notice: Subject to any disclaimer, the term of this patent is extended or adjusted under 35 U.S.C. 154(b) by 0 days.

(21) Appl. No.: 15/754,312

(22) PCT Filed: Sep. 7, 2016

(86) PCT No.: PCT/EP2016/071034
§ 371 (c)(1),
(2) Date: Feb. 22, 2018

(87) PCT Pub. No.: WO2017/042194
PCT Pub. Date: Mar. 16, 2017

(65) Prior Publication Data
US 2018/0258002 A1 Sep. 13, 2018

(30) Foreign Application Priority Data
Sep. 8, 2015 (NO) .................................. 20151154

(51) Int. Cl.
*C05C 9/00* (2006.01)
*C05G 3/08* (2006.01)
(Continued)

(52) U.S. Cl.
CPC .............. *C05C 9/005* (2013.01); *A23K 20/10* (2016.05); *A23K 40/10* (2016.05); *A23K 40/30* (2016.05);
(Continued)

(58) Field of Classification Search
None
See application file for complete search history.

(56) References Cited

U.S. PATENT DOCUMENTS

| 4,582,524 A | 4/1986 | Lobitz |
| 2004/0016275 A1* | 1/2004 | Hartmann ................. C05B 7/00 71/55 |

(Continued)

FOREIGN PATENT DOCUMENTS

| CN | 104478576 A * | 4/2015 | ........... A01C 21/005 |
| DE | 10 2009 034433 A1 | 1/2011 | |

(Continued)

OTHER PUBLICATIONS

PCT International Search Report and Written Opinion dated Dec. 1, 2016 for PCT International Patent Application No. PCT/EP2016/071034, 15 pages.

(Continued)

*Primary Examiner* — Wayne A Langel
(74) *Attorney, Agent, or Firm* — Amster, Rothstein & Ebenstein LLP

(57) ABSTRACT

The invention relates to a homogeneous, solid, particulate, urea ammonium sulphate-based composition comprising urea ammonium sulphate and a urease inhibitor of the type phosphoric triamide, wherein the urea ammonium sulphate-based composition is further characterized in that one or more of the following measures applies: a) it comprises 5 weight % or less, relative to the total weight of the composition, of one or more alkaline or alkaline-forming inorganic or organic compounds that is able to interact with ammonium sulphate; b) the urease inhibitor of the type phosphoric triamide is in a solid particulate form; c) an anticaking and/or moisture repellent coating is applied onto the urea ammonium sulphate particulate material. The composition according to the invention has improved properties for (Continued)

reducing ammonia loss by urease activity in the soil and is in particular suitable as a fertilizer. The invention further relates to a method for the manufacture of a homogeneous, solid, particulate urea ammonium sulphate-based composition comprising urea, ammonium sulphate and a urease inhibitor of the type phosphoric triamide, in particular N-(n-butyl) thiophosphoric triamide (nBTPT), as well as to a composition of kit of parts comprising: a) one or more alkaline or alkaline-forming inorganic compounds that is able to interact with ammonium sulphate; b) the urease inhibitor of the type phosphoric triamide in solid particulate or liquid form, preferably wherein the urease inhibitor is N-(n-butyl) thiophosphoric triamide (nBTPT); c) optionally, one or more anticaking and/or moisture repellent compounds.

14 Claims, 7 Drawing Sheets

(51) Int. Cl.
  C05C 3/00      (2006.01)
  A23K 40/10     (2016.01)
  A23K 20/10     (2016.01)
  A23K 40/30     (2016.01)
  C05G 3/00      (2020.01)
(52) U.S. Cl.
  CPC ............ C05C 3/005 (2013.01); C05G 3/0035 (2013.01); C05G 3/08 (2013.01)

(56) References Cited

U.S. PATENT DOCUMENTS

| | | |
|---|---|---|
| 2007/0157689 A1 | 7/2007 | Sutton et al. |
| 2009/0084149 A1* | 4/2009 | Van Der Werf ........... B01J 2/26 71/28 |
| 2012/0096912 A1 | 4/2012 | Rizzo |
| 2013/0219979 A1* | 8/2013 | Deb ..................... C05G 3/0041 71/27 |
| 2013/0276495 A1 | 10/2013 | Sutton et al. |
| 2013/0283873 A1 | 10/2013 | Sutton et al. |
| 2013/0319060 A1 | 12/2013 | Niehues et al. |
| 2014/0047884 A1 | 2/2014 | Gabrielson et al. |
| 2014/0260467 A1* | 9/2014 | Peacock ................... C05B 7/00 71/27 |
| 2015/0203413 A1 | 7/2015 | Gabrielson et al. |

FOREIGN PATENT DOCUMENTS

| | | |
|---|---|---|
| EP | 0 022 536 A1 | 1/1981 |
| EP | 2 431 346 A1 | 3/2012 |
| EP | 2885263 A1 | 6/2015 |
| JP | H10 203888 A | 8/1998 |
| WO | 02/090295 A1 | 11/2002 |

OTHER PUBLICATIONS

PCT International Preliminary Report on Patentability dated Dec. 14, 2017 in connection with PCT International Patent Application No. PCT/EP2016/071034, 15 pages.

PCT Written Opinion dated Aug. 21, 2017 in connection with PCT International Patent Application No. PCT/EP2016/071034, 4 pages.

* cited by examiner

UREA AMMONIUM SULPHATE-BASED COMPOSITION AND METHOD FOR THE MANUFACTURE THEREOF

CROSS-REFERENCE TO RELATED APPLICATIONS

This application is a U.S. national stage entry under 35 U.S.C. § 371 of PCT International Patent Application No. PCT/EP2016/071034, filed Sep. 7, 2016, which claims priority to Norwegian Patent Application No. 20151154, filed Sep. 8, 2015, the contents of which are incorporated herein by reference in their entirety.

SUMMARY OF THE INVENTION

This invention relates to a homogeneous, solid, particulate, urea ammonium sulphate-based composition, further comprising a urease inhibitor of the type phosphoric triamide, in particular N-(n-butyl) thiophosphoric triamide (nBTPT), which improved properties for reducing ammonia loss by urease activity in the soil. The invention further relates to a method for the manufacture of a homogeneous, solid, particulate urea ammonium sulphate-based composition comprising urea, ammonium sulphate and a urease inhibitor of the type phosphoric triamide, in particular N-(n-butyl) thiophosphoric triamide (nBTPT). The product is in particular suitable as a fertilizer.

BACKGROUND OF THE INVENTION

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is the basic constituent for any living system as a constituent of protein.

Due to intensive farming and the reduction of sulphur emissions in the air by industry and the subsequent supply to the ground via rain, modern agriculture requires sulphur in addition to nitrogen.

Good agricultural practice usually require nitrogen and sulphur in a ratio 10/1 to 5/1 in order to answer to the crop demand, for example 150 kg nitrogen/ha/year and 30 kg sulphur/ha/year.

Lack of sulphur results both in a lower quantity and a lower quality of crops, and sulphur deficiency is often reflected in the content and type of proteins. Sulphur is indeed a major element entering into the chemistry of the cells in molecules such as amino acids (cysteine, methionine, etc.). It is also a catalyst for the photosynthesis and, in some cases, may improve the fixation of atmospheric nitrogen.

Conventionally, sulphur has been applied to the soil in the form of elemental sulphur, or as compounds such as ammonium sulphate, ammonium bisulphate, thiosulfates, sulphides or gypsum, or in combination with other fertilizer materials such as urea, for example as a physical blend of urea and ammonium sulphate, or as a co-granulated urea and ammonium sulphate material, the latter which is hereinafter called urea ammonium sulphate, abbreviated as UAS.

Like urea, the urea that is present in UAS is also hydrolysed in the soil under the action of an enzyme catalyst, commonly called urease, to produce ammonia and carbon dioxide. Ureases are found in numerous bacteria, fungi, algae, plants and some invertebrates, as well as in soils, as a soil enzyme. Urease activity tends to increase the pH of its environment as the ammonia is dissolved into the water in the soil, which is taken up by the plants as their principle source of nitrogen. However, ammonia can also be released into the atmosphere, thus becoming unavailable for the plant root system, a process called ammonia volatilization. Up to 50 weight % of nitrogen can be lost as a result of the volatilization of ammonia, all depending on the soil type, water content, pH, climate conditions, etc.

The availability of nitrogen, originating from urea, to the root system of plants can be improved by combining (i.e. by incorporation or addition) a urease inhibitor with a urea-containing fertilizer. Urease inhibitors are compounds that are capable of temporarily reducing the activity of the enzyme and slow down the rate at which urea is hydrolysed. There are many compounds that can inhibit urease, but only a few that are non-toxic, effective at low concentrations, chemically stable enough and able to be combined with urea-containing fertilizers.

Among the most effective urease inhibitors known today are the phosphoric triamide compounds, first disclosed in U.S. Pat. No. 4,530,714 (Allied Corporation, 1985).

An example of an effective urease inhibitor, disclosed in said patent is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides.

When combined with a urea-containing fertilizer, phosphoric triamide compounds reduce the rate at which urea is hydrolysed to ammonia in the soil. The benefits that are realized as a result of the delayed urea hydrolysis include the following: (1) nutrient nitrogen is available to the plant over a longer period of time, (2) excessive build-up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While phosphoric triamide compounds do not directly influence the rate of ammonium nitrification, they do control the levels of ammonium which are subject to the nitrification process and thereby indirectly controls the levels of nitrate nitrogen in the soil.

Surprisingly, the inventors have now been confronted with the problem that the urease inhibitor of the type phosphoric triamide, when applied as a liquid, which is the most common commercially available form, is not stable when in contact with urea ammonium sulphate material, despite the fact that the use of a urease inhibitor of the type phosphoric triamide is generally disclosed for urea-based fertilizers, such as UAS. Moreover, even a stabilised urease inhibitor of the type phosphoric triamide in an alkaline organic solvent, such as a mixture of propylene glycol and N-methylpyrrolidine is rapidly degraded. In this context, with stability is meant that the original urease inhibitor is chemically degraded. This finding was most surprising, but stimulated the inventors to find a solution for the problem of stabilizing the urease inhibitor (i.e. reducing its degradation) in the presence of urea ammonium sulphate material.

PRIOR ART

The problem of stabilizing a urease inhibitor (i.e. reducing its degradation) in the presence of urea ammonium sulphate material is not disclosed in the prior art, nor are measures to prevent such degradation.

WO2011/009572 (SKW Stickstoffwerke Piesteritz GmbH, 2011) discloses a urea-based granular fertilizer composition comprising urea, a urease inhibitor of the type phosphoric triamide in powder form and a paraffin-based wax. A composition comprising urea ammonium sulphate is not disclosed, nor is the problem of the current invention.

US 2012/0096912 (Rizzo, 2012) discloses a method for improving the yield of rice plants by applying a granular UAS that includes nBTPT. The problem according to our invention is not mentioned, nor is any of the measures proposed in the current invention.

STATEMENT OF THE INVENTION

Surprisingly, the inventors now found that the stability of the urease inhibitor of the type phosphoric triamide in the presence of a urea ammonium sulphate material can be greatly improved when one or more measures, alone or in combination, are applied.

In its broadest concept, the invention is concerned with a homogeneous, solid, particulate, urea ammonium sulphate-based composition comprising urea ammonium sulphate and a urease inhibitor of the type phosphoric triamide, wherein the urea ammonium sulphate-based composition is further characterized in that one or more of the following measures applies:
  a) it comprises 5 weight % or less, relative to the total weight of the composition, of one or more alkaline or alkaline-forming inorganic or organic compounds that is able to interact with ammonium sulphate; or
  b) the urease inhibitor of the type phosphoric triamide is in a solid particulate form; or
  c) an anticaking and/or moisture repellent coating is applied onto the particulate urea ammonium sulphate material.

With regard to the measures, without being bound by theory, it is hypothesised that the alkaline or alkaline-forming inorganic or organic compound neutralises the released phosphoric acid which is formed during decomposition of the urease inhibitor of the type phosphoric triamide in view of the fact that the decomposition of the urease inhibitor of the type phosphoric triamide is acid-catalysed. As such, the decomposition of the urease inhibitor of the type phosphoric triamide is slowed down. Furthermore, the alkaline or alkaline-forming inorganic or organic compound that is able to react with the ammonium sulphate has the ability to immobilize the ammonium sulphate and/or to convert the ammonium sulphate into a form which is less reactive with the urease inhibitor of the type phosphoric triamide. For example, calcium oxide may react with the ammonium sulphate in the presence of water, which is always present in small amounts in the urea ammonium sulphate, to form calcium sulphate, which is insoluble in an aqueous environment, such as a soil.

Furthermore, without being bound by theory, it is hypothesised that the contact surface between the urea ammonium sulphate material and the urease inhibitor of the type phosphoric triamide is minimized by selecting a solid form for the urease inhibitor of the type phosphoric triamide, instead of a liquid form, which is commonly employed in the art, or by coating the urea ammonium sulphate material, the urease inhibitor of the type phosphoric triamide in its solid form, or both.

Moreover, without being bound by theory, it is hypothesised that the addition of an anticaking and/or moisture repellent coating slows down the degradation of nBTPT due to the fact that the anticaking and/or moisture repellent coating acts as a protection layer between nBTPT and ammonium sulphate and this partially prevents reaction between nBTPT and ammonium sulphate. Also, the coating partially prevents moisture uptake, and as the presence of moisture increases the rate of decomposition of nBTPT, this decomposition is slowed down by the addition of the anticaking and/or moisture repellent coating.

By applying one or more of these measures, alone or in combination, to the urea ammonium sulphate-based composition comprising urea ammonium sulphate and a urease inhibitor of the type phosphoric triamide, the stability of the urease inhibitor of the type phosphoric triamide is greatly improved, leading, among others, to lower ammonia emissions, even when the urease inhibitor of the type phosphoric triamide was added to the urea ammonium sulphate-based composition a long time before the actual application on the field as a fertilizer.

The claimed measures can be applied independently from each other or in any combination, wherein certain combinations can be more preferred than others depending on the actual situation of the composition according to the invention, such as storage temperature (low, high), application climate (tropical, arid), etc. The invention will now be described in more detail.

DETAILED DESCRIPTION OF THE INVENTION

In its broadest concept, the invention is concerned with a homogeneous, solid, particulate, urea ammonium sulphate-based composition comprising urea ammonium sulphate and a urease inhibitor of the type phosphoric triamide, in particular N-(n-butyl) thiophosphoric triamide (nBTPT), wherein the urease inhibitor of the type phosphoric triamide is a compound of formula I:

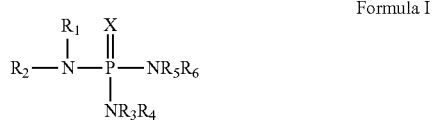

Formula I wherein:
  X is oxygen or sulphur;
  $R_1$ is alkyl, cycloalkenyl, aralkyl, aryl, alkenyl, alkynyl, or cycloalkyl;
  $R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
  $R_3$, $R_4$, $R_5$ and $R_6$ are individually hydrogen or alkyl having 1 to 6 carbon atoms. In the present specification and claims, the term "phosphoric triamide compounds" is used to refer to the compounds of formula I.

nBTPT is sold as the most effective known urease inhibitor and has the following chemical formula

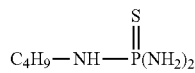

It should be understood that the term nBTPT, as used throughout this specification, refers not only to N-(n-butyl) thiophosphoric triamide in its pure form, but also to industrial grades of this compound which may contain up to 50 weight % impurities, depending on the method of synthesis and purification scheme(s), if any, employed in the production of the nBTPT.

In order to be effective, the urease inhibitor of the type phosphoric triamide, in particular N-(n-butyl) thiophosphoric triamide (nBTPT) is present in the urea ammonium sulphate-based composition at a level of 0.0001-1% weight %, preferable 0.02-0.2% weight %, most preferably 0.04-0.06 weight %.

In embodiments where the urease inhibitor is used in its liquid form, it is preferably used as a 0.1 to 75 weight % solution, preferably as a 15 to 30 weight % solution. Commercial solutions are available, for example as Agrotain® Ultra (Koch, US), N Yield™ (Eco Agro, The Netherlands), Rhodia Ag-Rho™ N Protect B (Solvay, Germany), Iper N-Protect Liquid (Van Iperen, The Netherlands) and BASF Limus (BASF, Germany).

Experiments showed that, in compositions according to the invention, less urease inhibitor of the type phosphoric triamide, in particular N-(n-butyl) thiophosphoric triamide (nBTPT) needs to be used than is commonly employed in the prior art. For example, an amount of 0.05 weight % is most preferred, while for the use of Agrotain® Ultra, an amount of 0.09 weight % is recommended. This finding can at least partly be attributed to the fact that in the compositions according to the invention, the urease inhibitor of the type phosphoric triamide, in particular N-(n-butyl) thiophosphoric triamide (nBTPT) is stabilized, while in the prior art, an overdose is needed to compensate for the degradation of the urease inhibitor and to increase shelf-live thereof. This finding also ensures that less urease inhibitor of the type phosphoric triamide, in particular N-(n-butyl) thiophosphoric triamide (nBTPT) is introduced into the environment.

In embodiments where the urease inhibitor is used in its solid form, it is used as a powder, preferably with a purity of 99 weight % or more. It is available, for example, from Sunfit Chemical Co. (China).

The urease inhibitor of the type phosphoric triamide, in particular N-(n-butyl) thiophosphoric triamide (nBTPT) is applied to the composition comprising the urea ammonium sulphate particles by common coating and blending techniques, well known to the skilled person, such as spray-coating and drum-coating.

According to a first embodiment of the present invention, the homogeneous, solid, particulate, urea ammonium sulphate-based composition comprising urea ammonium sulphate and a urease inhibitor of the type phosphoric triamide comprises 5 weight % or less, relative to the total weight of the composition, of one or more alkaline or alkaline-forming inorganic or organic compounds that is able to interact with ammonium sulphate [measure a)]. According to one embodiment, said alkaline or alkaline-forming inorganic compound that is able to interact with ammonium sulphate, is selected from the group of metal oxides, such as calcium oxide, magnesium oxide, zinc oxide, sodium oxide, aluminium oxide, barium oxide and copper oxide; carbonates, such as calcium carbonate, sodium carbonate, ammonium carbonate, barium carbonate; hydroxides, such as aluminium hydroxide, ammonium hydroxide, sodium hydroxide, potassium hydroxide, calcium hydroxide, magnesium hydroxide, iron hydroxide, barium hydroxide and tetraalkyl/aryl ammonium hydroxides; and acetates, such as sodium acetate, ammonium acetate, magnesium acetate, zinc acetate and barium acetate, and any mixture thereof.

According to one embodiment of the present invention, said alkaline or alkaline-forming organic compound that is able to interact with ammonium sulphate, is selected from the group of organic bases, such as ammonia; amines, such as triethylamine, ethanolamine and triethanolamine; amides, such as sodium amide and magnesium diamide; adenines; amidines; guanidines; anilines; carbamates; thiazoles; triazoles; pyridines; imidazoles; benzimidazoles; histidines; phosphazenes, and any mixture thereof.

By including 5 weight % or less, relative to the total weight of the composition, of one or more alkaline or alkaline-forming inorganic or organic compounds that is able to interact with ammonium sulphate in the urea ammonium sulphate-based composition comprising urea ammonium sulphate and a urease inhibitor of the type phosphoric triamide, the stability of the ammonium sulphate-based composition, comprising the urease inhibitor of the type phosphoric triamide is greatly improved, leading, among others, to lower volatile ammonia emissions.

Preferably, the alkaline or alkaline-forming inorganic or organic compound is selected from the group of calcium oxide, zinc oxide, magnesium oxide, calcium carbonate, and any mixture thereof. Advantageously, these metals (Ca, Zn and Mg) may also function as a nutrient element to plants in the soil.

Within the context of this application, the wording "able to interact" means that the alkaline or alkaline-forming inorganic or organic compound is able to react in any way (ionic, covalent, chelating, etc.) with ammonium sulphate and immobilize the ammonium sulphate and/or convert the ammonium sulphate into a form which is less reactive with the urease inhibitor of the type phosphoric triamide. This excludes, for example, compositions comprising organic alkaline solvents as carriers for the urease inhibitor of the type phosphoric triamide. Compositions comprising such organic alkaline solvents acting as carriers for a urease inhibitor of the type phosphoric triamide are known from e.g. US 2014/0037570 and are commercially available.

In order to be effective, the alkaline or alkaline-forming inorganic or organic compound is present in the composition at a level of 0.0001-5 weight %, preferable 0.02-1 weight %, most preferably 0.05-0.25 weight %.

The alkaline or alkaline-forming inorganic or organic compound is applied to the composition comprising the urea ammonium sulphate particles by common application techniques, such as coating and blending techniques, well known to the skilled person, such as spray-coating and drum-coating. It is preferred that the alkaline or alkaline-forming inorganic or organic compound and the urease inhibitor of the type phosphoric triamide is in intimate contact with each other, in order for the alkaline or alkaline-forming inorganic or organic compound to be effective. This can be achieved, most preferably, through the application of the urease inhibitor of the type phosphoric triamide, the alkaline or alkaline-forming compound that is able to interact with the urea ammonium sulphate (the stabilizer) and the anticaking and/or moisture repellent coating to the particles, either successively, or simultaneously, for example as a liquid anticaking and/or moisture repellent coating composition comprising the urease inhibitor of the type phosphoric triamide and the alkaline or alkaline-forming compound.

According to a second embodiment, the present invention is also concerned with a homogeneous, solid, particulate, urea ammonium sulphate-based composition comprising urea ammonium sulphate and a urease inhibitor of the type phosphoric triamide, wherein the urease inhibitor of the type phosphoric triamide is in solid particulate form [measure b)]. Surprisingly, it was observed that, when the urease inhibitor of the type phosphoric triamide is a solid particulate material, its stability in the presence of a urea ammonium sulphate material is further improved compared to its liquid form.

According to one embodiment, the weight ratio of urease inhibitor of the type phosphoric triamide to one or more alkaline or alkaline-forming inorganic compounds that is able to interact with ammonium sulphate in the compositions according to the invention ranges from 1:20 to 1:1, preferably from 1:15 to 1:1, more preferably from 1:10 to 1:1. Exemplary, a weight ratio of nBTPT to CaO of about 1/5.5 was used.

According to a third embodiment, the present invention is also concerned with a homogeneous, solid, particulate, urea ammonium sulphate-based composition comprising urea ammonium sulphate and a urease inhibitor of the type phosphoric triamide, wherein a moisture repellent coating is applied at least onto the urea ammonium sulphate particulate material, wherein the coating material is able to increase the moisture repellence of the urea ammonium sulphate material [measure c)]. Furthermore, the coating may also be able to reduce dust formation. Preferably, the coating material is a non-polar material, in particular a liquid organic material, such as an oil, wax, resin or the like and any mixture thereof and is present in the composition at a level of 0.0001-1 weight %, preferable 0.02-0.5 weight %, most preferably 0.1-0.2 weight %.

Examples of suitable anticaking and/or moisture repellent coatings are vegetable oil (e.g. rapeseed or neem), paraffin and Novoflow anti-caking and/or moisture repellence agents (Novochem Fertilizer Additives, The Netherlands).

Preferably, the moisture repellent coating is a coating such as disclosed in EP 0768993 A1 (Norsk Hydro ASA) for a nitrogen-containing fertilizer, comprising at least a wax, an oil and a resin which is oil-soluble and miscible with wax. Accordingly, EP 0768993 is incorporated herein by reference.

The invention also covers embodiments where one or more of the above measures a), b) and c) is combined, i.e. the combinations a)+b), a)+c), b)+c) and a)+b)+c). The combination of a)+b)+c) is most preferred, optionally including bagging of the resulting composition according to the invention.

Furthermore, it was observed that, under bagged conditions without the presence of a head space, i.e. with the exclusion of moisture, atmospheric gasses such as oxygen, nitrogen, etc., the stability of the claimed composition comprising a urea ammonium sulphate material and a urease inhibitor of the type phosphoric triamide, in particular N-(n-butyl) thiophosphoric triamide (nBTPT), was further increased. According to one embodiment, a homogeneous, solid, particulate, urea ammonium sulphate-based composition comprising urea ammonium sulphate and a urease inhibitor of the type phosphoric triamide, wherein the urease inhibitor of the type phosphoric triamide is in a solid particulate form, has a half-life time for nBTPT up to 4 months when stored in bags at room temperature (20-25° C.), contrary to an equivalent composition having the same urease inhibitor in liquid form, with a half-life time for nBTPT of only a few days when stored in bags at room temperature (20-25° C.). Hence, the invention is in particular directed to a bagged urea ammonium sulphate-based composition comprising urea ammonium sulphate and a solid particulate urease inhibitor of the type phosphoric triamide, in particular N-(n-butyl) thiophosphoric triamide (nBTPT). As used in this application, "bagged" means that the product is packaged such that it is in essence not in contact with moisture and atmospheric gasses during the period it is packaged. Hence, the package may be a bag, container, box, etc., being in principle all packaging without the presence of a head space, filled with an atmosphere, such as air.

The urea ammonium sulphate is a co-granulated material and may be obtained in several ways, such as by melt-mixing molten urea and solid particulate ammonium sulphate by a process of adding solid particulate ammonium sulphate to molten urea in a granulation step, such as a drum or a pan, as described in U.S. Pat. No. 3,785,796 (Tennessee Valley Authority, 1974), or using a fluidized bed granulator, as described, for example in WO 99/65845 (SKW Stickstoffwerke Piesteritz GmbH, 1999) or as used by Yara in its plants in Sluiskil (The Netherlands).

Alternatively, the urea ammonium sulphate may also be prepared according to WO 92/12633 (FMC Corp., USA) or the like, as a compacted material wherein a finely divided solid urea and ammonium sulphate powder is compacted, together with a microcrystalline cellulose to form pastilles, tablets and the like.

Alternatively, the urea ammonium sulphate may be obtained in a chemical process for the production of urea from carbon dioxide and ammonia, wherein ammonia is neutralized to form ammonium sulphate (AS) in the urea melt or solution to produce UAS, as disclosed in WO 2006/004424 A1 (Yara International ASA, Norway), and more specifically using a pipe reactor as a tail end process of a classical urea plant, as disclosed in WO 2006/093413 A1, Yara International ASA, Norway). In a specific embodiment, the ammonia neutralization may be effected in the scrubber by sulphuric acid and recycling into the urea melt and granulation.

In any case, the invention is concerned with a UAS of which the granules are homogeneous in composition, i.e. each granule comprises in principle the same materials.

Independently of its method of production, UAS may contain from about 0.1 to 60 weight % of ammonium sulphate (AS), preferably 1 weight % or more, more preferably 5 weight % or more, more preferably 10 weight % or more, relative to the total weight of the UAS, of which the remainder of the weight is preferably urea. Preferred grades comprise about 23 to about 30 weight % of AS [such as YaraVera® Amidas™ (40-0-0 5.5 S), Yara International ASA, which is a homogeneous granular fertilizer containing urea and ammonium sulphate with a 7.3:1 N to S ratio, and YaraVera® Ureas™ (38-0-0 7.5 S), Yara International ASA, which is a homogeneous granular fertilizer containing urea and ammonium sulphate with a 5:1 N to S ratio].

The urea-ammonium sulphate composition according to the invention comprises 50 to 100 weight %, preferably 75 to 100 weight %, more preferably 90 to 100 weight % of urea ammonium sulphate material in particulate form. Preferably, to serve as a fertilizer, the particle size (dp50) is between 1.0 and 6.0 mm, preferable between 2.0 and 4.0 mm, most preferably between 3.2 and 3.5 mm, as determined by mesh sieve screening.

The invention further relates to a method for the manufacture of a homogeneous, solid, particulate urea ammonium sulphate-based composition comprising urea ammonium sulphate, 5 weight % or less, relative to the total weight of the composition, of one or more alkaline or alkaline-forming inorganic or organic compounds that is able to interact with ammonium sulphate, and a urease inhibitor of the type phosphoric triamide, in particular N-(n-butyl) thiophosphoric triamide (nBTPT).

In particular, the invention relates to a method for the manufacture of a homogeneous, solid, particulate, urea ammonium sulphate-based composition according to the invention, the method comprising the steps of:

1) providing a urea ammonium sulphate material;
2) adding 5 weight % or less, relative to the total weight of the composition, of one or more alkaline or alkaline-forming inorganic or organic compounds that is able to interact with ammonium sulphate;
3) adding a urease inhibitor in solid particulate or liquid form, preferably wherein the urease inhibitor is N-(n-butyl) thiophosphoric triamide (nBTPT); and
4) optionally, applying a coating that is able to increase at least the water repellence and/or anticaking properties of urea ammonium sulphate, preferably wherein said coating is as disclosed in EP 0768993 A1 (which is incorporated herein by reference);

wherein the steps 2), 3) and 4) can be interchanged or wherein steps 2), 3) and 4) can be performed simultaneously, for example as the addition of a liquid anticaking and/or moisture repellent coating composition comprising the urease inhibitor of the type phosphoric triamide and the alkaline or alkaline-forming compound.

In this respect the invention relates also to a kit of parts, comprising a) one or more alkaline or alkaline-forming inorganic compounds that is able to interact with ammonium sulphate, preferably wherein the alkaline or alkaline-forming compound is selected from the group of metal oxides, such as calcium oxide, magnesium oxide, zinc oxide, sodium oxide, aluminium oxide, barium oxide and copper oxide; carbonates, such as calcium carbonate, sodium carbonate, ammonium carbonate, barium carbonate; hydroxides, such as aluminium hydroxide, ammonium hydroxide, sodium hydroxide, potassium hydroxide, calcium hydroxide, magnesium hydroxide, iron hydroxide, barium hydroxide and tetraalkyl/aryl ammonium hydroxides; and acetates, such as sodium acetate, ammonium acetate, magnesium acetate, zinc acetate and barium acetate, and any mixture thereof;
b) the urease inhibitor of the type phosphoric triamide in solid particulate or liquid form, preferably wherein the urease inhibitor is N-(n-butyl) thiophosphoric triamide (nBTPT);
c) optionally, one or more anticaking and/or moisture repellent compounds.

The components of such kit of parts can then be added to solid particulate urea ammonium sulphate in a desired amount to obtain the homogeneous, solid, particulate, urea ammonium sulphate-based composition comprising urea ammonium sulphate and a urease inhibitor of the type phosphoric triamide according to the invention.

According to one embodiment, the components are provided in separate units. According to another embodiment, the components are premixed and provided in a combined unit. Preferably, they are premixed in a weight ratio of urease inhibitor of the type phosphoric triamide to one or more alkaline or alkaline-forming inorganic compounds that is able to interact with ammonium sulphate of 1:20 to 1:1, preferably 1:15 to 1:1, more preferably 1:10 to 1:1.

Finally, the invention concerns a method for improving the stability of a urease inhibitor of the type phosphoric triamide, in particular N-(n-butyl) thiophosphoric triamide (nBTPT), in an urea ammonium sulphate-based composition comprising urea ammonium sulphate and said urease inhibitor, by one or more of the following measures:

a) addition to the composition of 5 weight % or less, relative to the total weight of the composition, of one or more alkaline or alkaline-forming inorganic or organic compounds that is able to interact with ammonium sulphate; or
b) selection of a urease inhibitor of the type phosphoric triamide which is in a solid particulate form; or
c) application of an anticaking and/or moisture repellent coating onto the particulate urea ammonium sulphate material.

Detailed embodiments have been discussed herein above and in the following examples.

The preferred embodiments of the method according to the invention will now be illustrated by means of the following non-limitative examples.

EXAMPLES

EXPERIMENTAL SECTION

1. Volatilization Measurements

Figure 1:
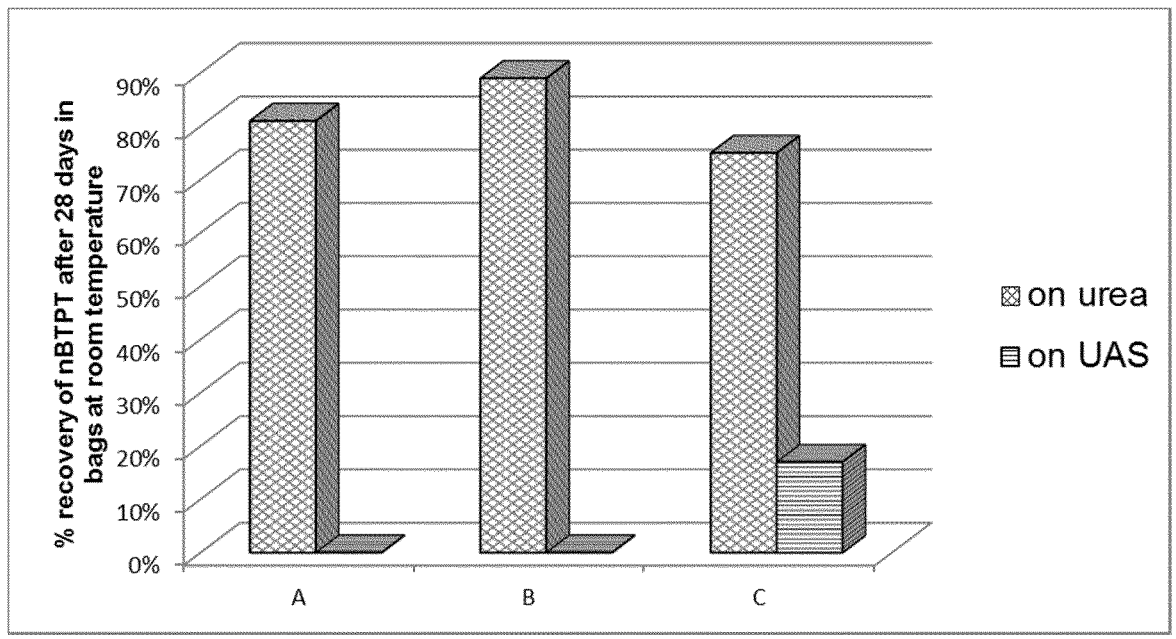
FIG. 1. Stability of different liquid nBTPT-formulations applied on particulate urea versus applied on particulate UAS-% recovery of nBTPT after 28 days of storage under bagged storage conditions at room temperature (20-25° C.). [A=Agrotain® Ultra (KOCH), B=N Yield™ (Eco Agro), C=Rhodia Ag-Rho™ N Protect (Solvay)].

Erlenmeyer flasks were filled with 300 g air-dried, arable topsoil, irrigated to a desired % of its WHC (Water Holding Capacity), incubated for 6 days prior to the application of the fertilizers. Fertilizers (2.5-3.15 mm granule size) at a concentration of 100 mg N/flask were applied over the soil surface. Boric acid traps were installed to catch volatile ammonia from the air above the topsoil, and the Erlenmeyer flasks were installed in a Phytotron chamber at 25° C. at windy but not dry conditions.

Measurements:
Titration of boric acid traps 3, 7, 10, and 14 days after fertilizer application;
Calculation of cumulative N loss, and N loss reduction in comparison to urea;
Soil pH at the beginning of the trial;
mineral N ($NH_4$ and $NO_3$) and total soluble N at the end of trial;
Urea-N calculated as difference between N total and N mineral.

2. nBTPT Experiments

For lab scale experiments, 1.2 kg of solid fertilizer material was added to a lab scale drum. In a next step, the nBTPT material was slowly added. A residence time of 10 minutes was applied and the rotating speed of the drum was consequently the same in each experiment. In case a moisture repellent coating was added, a nebulizer was used and depending on the order of addition, the moisture repellent coating was added before or after addition of the nBTPT material. Before use, the moisture repellent coating was preheated to 80° C. Larger scale experiments with amounts up to 40 kg of fertilizer material were performed in a concrete mixer.

The samples were stored under several conditions, dependent on the type of samples:
20° C. closed plastic container with head space (Climate chamber, 80% relative humidity)
Bagged at room temperature (20-25° C.) or in nissenhut
Open to air in nissenhut
Cylinder test in nissenhut
Open pile in nissenhut For some samples, an accelerated stability test was done storing these samples at elevated temperatures:
Oven of 30° C. closed plastic container
Oven of 30° C. open to air
30° C./60% RH open to air
70° C. closed plastic container Typically, a day/night cycle is generated in the nissenhut, with temperature fluctuations between 0 to 42° C. and fluctuations of relative humidity between 20 and 90%, which can be compared with real life storage in silos.

3. HPLC Analysis of nBTPT-Content

HPLC analysis of nBTPT is done as described in the procedure CEN 15688-2007.

4. Products

Urea was obtained from Yara as granules YaraVera® Urea 46-0-0 (product code PA38M2).

UAS was obtained from Yara as granules YaraVera® Amidas 40-0-0 (product code PA421X). Solid N-(n-butyl) thiophosphoric triamide was obtained from Sunfit Chemical Co. (China) (CAS-Nr. 94317-64-3), as a white crystalline solid with a melting point of 58-60° C.

Coating: Moisture repellent (MR) coating was made according to EP 0768993 A1 (Norsk Hydro ASA) by mixing about 28 weight % of wax, about 68 weight % of oil and about 4 weight % of a resin, applied in an amount of about 0.1-0.5% weight % to the fertilizer. It will be referred herein as NH coating.

Example 1

Figure 2:
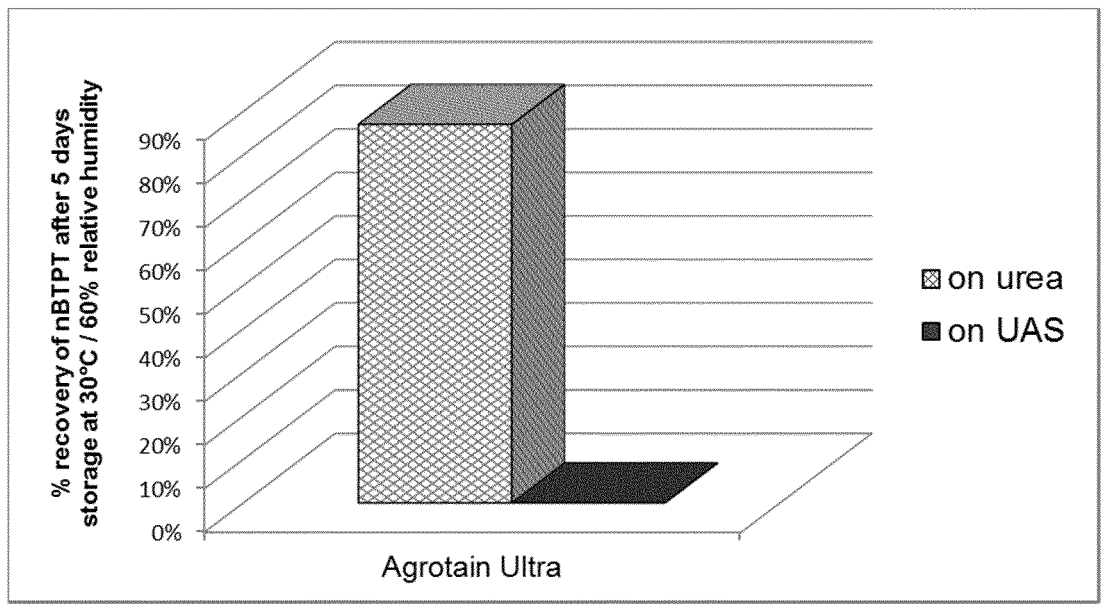
FIG. 2. Stability of Agrotain® Ultra (KOCH), applied on particulate urea versus applied on particulate UAS after 5 days of storage open to air at 30° C./60% relative humidity.

Example 1 defines the problem. FIG. 1 shows the stability of different commercially available liquid nBTPT-formulations, applied on urea, versus applied on UAS. The % recovery of nBTPT after 28 days of storage under bagged storage conditions at room temperature (20-25° C.) is shown. FIG. 1 shows clearly that, in contrast to urea, when liquid nBTPT formulations are applied on UAS, nBTPT degrades very fast and the nBTPT level drops to 0 weight % only in a few days. FIG. 2 confirms the previous observations for storage open to air and shows the stability of Agrotain® Ultra (KOCH), applied on urea, versus applied on UAS. After 5 days of storage open to air at 30° C./60% relative humidity, no nBTPT could be measured on UAS. In contrast, on urea, still 90% of the nBTPT is present.

Example 2

This example shows the beneficial effect of the addition of an alkaline or alkaline-forming inorganic or organic compound on UAS on the stability of nBTPT in the presence of UAS.

Figure 3:
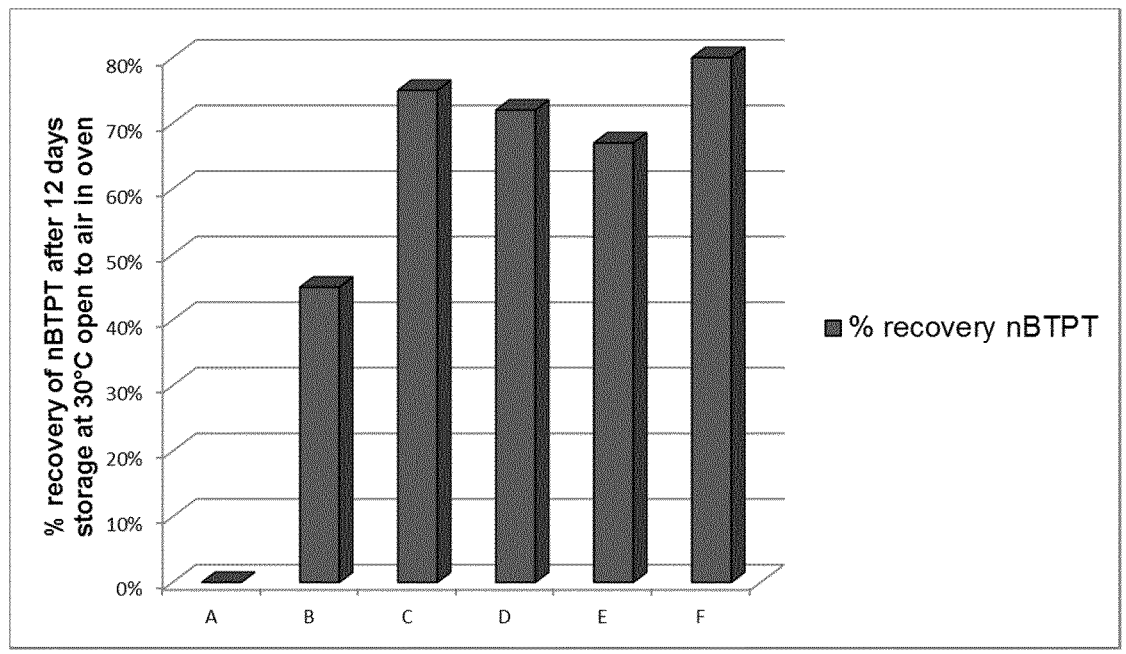
FIG. 3. Stability of nBTPT on particulate UAS: effect of the addition of different alkaline compounds—% recovery of nBTPT after 12 days of open to air storage at 30° C. in an oven.
A=UAS+500 ppm nBTPT powder;
B=UAS+500 ppm nBTPT powder+2350 ppm rapeseed oil;
C=UAS+500 ppm nBTPT powder+2350 ppm rapeseed oil+2650 ppm CaO;
D=UAS+500 ppm nBTPT powder+2350 ppm rapeseed oil+2650 ppm $CaCO_3$;
E=UAS+500 ppm nBTPT powder+2350 ppm rapeseed oil+150 ppm ethanolamine;
F=UAS+500 ppm nBTPT powder+2350 ppm rapeseed oil+2650 ppm ZnO.

FIG. 3 shows the stability of nBTPT, coated on UAS without or with the addition of different alkaline inorganic and organic compounds. The recovery of nBTPT after 12 days of open to air storage at 30° C. in an oven is shown.

FIG. 3 clearly shows the stabilizing effect on nBTPT on UAS by the addition of calcium oxide (solid), calcium carbonate (solid), ethanolamine (liquid) and zinc oxide (solid), where the best effect is obtained for zinc oxide.

Figure 4:
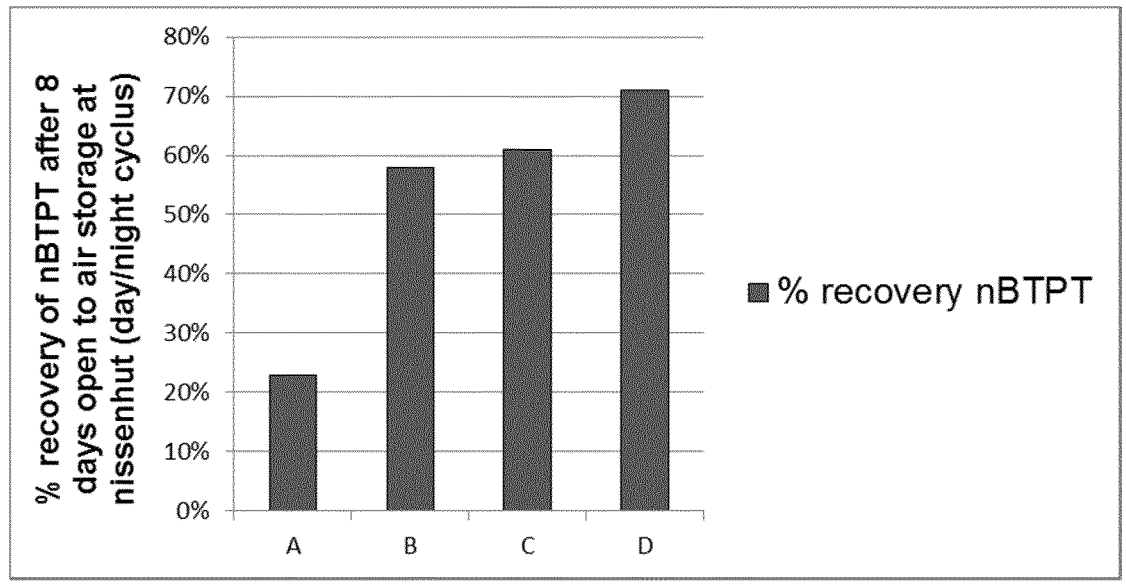
FIG. 4. Stability of nBTPT on particulate UAS: effect of the addition of CaO in different concentrations—% recovery of nBTPT after 8 days of open to air storage at nissenhut (day/night cycle 16-42° C./27-77% relative humidity).
A=UAS+500 ppm nBTPT powder;
B=UAS+500 ppm nBTPT powder+500 ppm CaO;
C=UAS+500 ppm nBTPT powder+1000 ppm CaO;
D=UAS+500 ppm nBTPT powder+2650 ppm CaO.

Furthermore, FIG. 4 shows the stability of nBTPT on UAS with the addition of calcium oxide in different concentrations. The recovery of nBTPT after 8 days of open to air storage at nissenhut (day/night cycle 16-42° C./27-77% relative humidity) is presented. The figure clearly shows that the addition of 500-2350 ppm calcium oxide to a composition comprising UAS and nBTPT has a large stabilizing effect on nBTPT on UAS, with a bigger stabilizing effect with increasing concentration of calcium oxide. Although already a large effect is obtained with 500 ppm, further improved stability will be obtained with higher concentrations, the amount to be determined by the skilled person, depending on the type of stabilizer, type of application, type of UAS, etc.

Example 3

This example shows the beneficial effect of the addition of nBTPT in solid particulate form to UAS on the stability of nBTPT on UAS, in comparison to the addition of nBTPT in liquid form to UAS.

Figure 5:
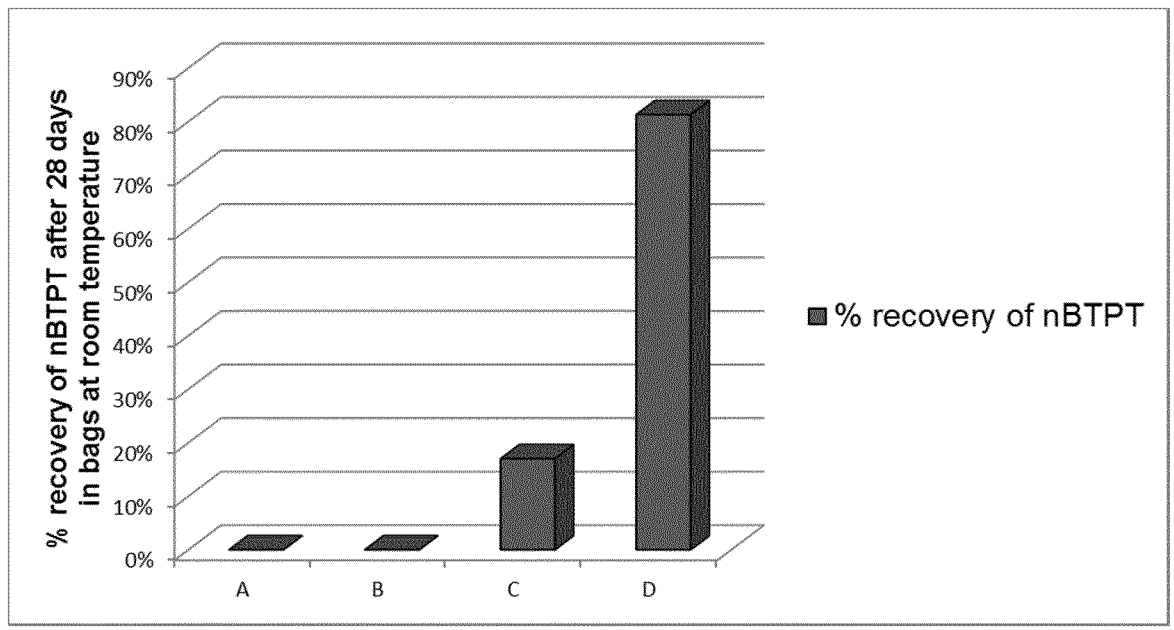
FIG. 5. Stability of different liquid nBTPT-formulations applied on particulate UAS versus nBTPT in solid form on particulate UAS—% recovery of nBTPT after 28 days of storage under bagged storage conditions at room temperature (20-25° C.).
A=500 ppm nBTPT as Agrotain® Ultra (KOCH)—liquid,
B=500 ppm nBTPT as N Yield™ (Eco Agro)—liquid, C=500 ppm nBTPT as Rhodia Ag-Rho™ N Protect (Solvay)—liquid,
D=500 ppm solid nBTPT (Sunfit Chemical Co.) FIG. 6. Stability of solid nBTPT (500 ppm) on particulate UAS: effect of the addition of different coatings—% recovery of nBTPT after 28 days of storage in closed plastic containers with head space at 20° C./80% relative humidity.
A=no coating;
B=Novoflow 1029 coating;
C=NH coating;
D=Paraffin coating;
E=VHO coating.

FIG. 5 shows the stability of different liquid commercially available nBTPT-formulations applied on UAS versus nBTPT in solid particulate form on UAS. The recovery of nBTPT after 28 days of storage under bagged storage conditions at room temperature (20-25° C.) is presented. The results clearly show that the addition of nBTPT in solid particulate form to UAS increases the stability of nBTPT on UAS to a high extent (about 80%) in comparison with the addition of nBTPT in liquid form to UAS.

Example 4

This example shows the beneficial effect of the addition of a moisture repellent coating on UAS on the stability of nBTPT on UAS.

Figure 6:
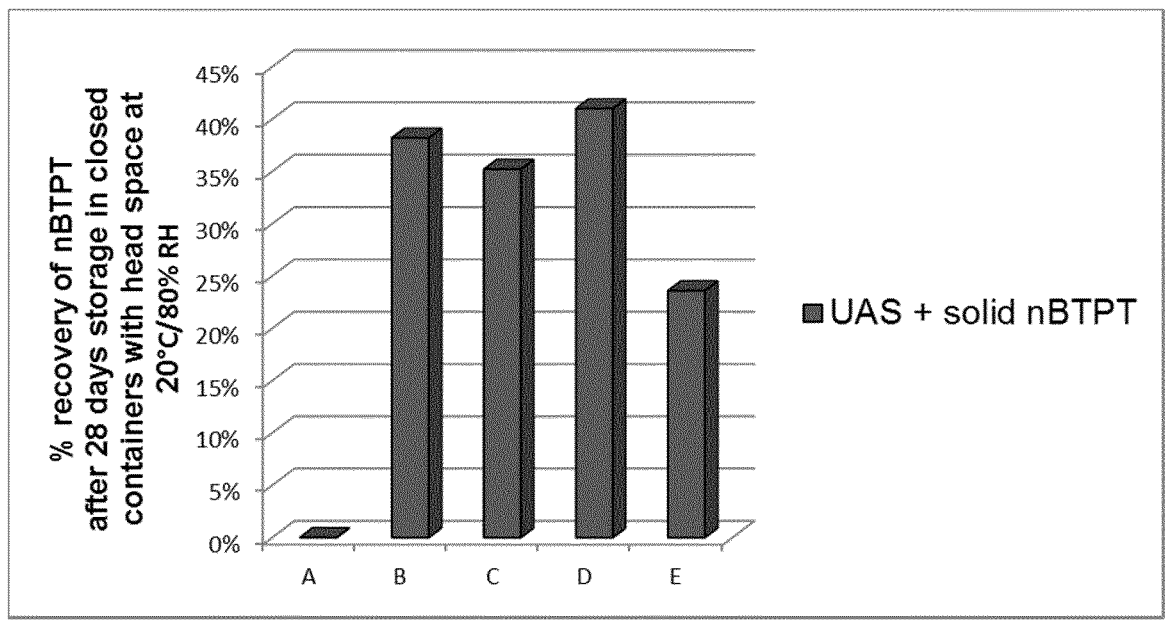

FIG. 6 shows the stability of solid nBTPT on UAS with or without the addition of different moisture repellent coatings. The recovery of nBTPT after 28 days of storage in closed plastic containers with head space at 20° C./80% relative humidity is presented. The graph clearly shows the big stabilizing effect of the addition of all the applied moisture repellent coatings on nBTPT on UAS.
No coating: 0% recovery of nBTPT
With coating: 23-41% recovery of nBTPT Example 5

This example shows the beneficial effect of the storage in bags without head space versus storage open to air on the stability of nBTPT on UAS.

Figure 7:
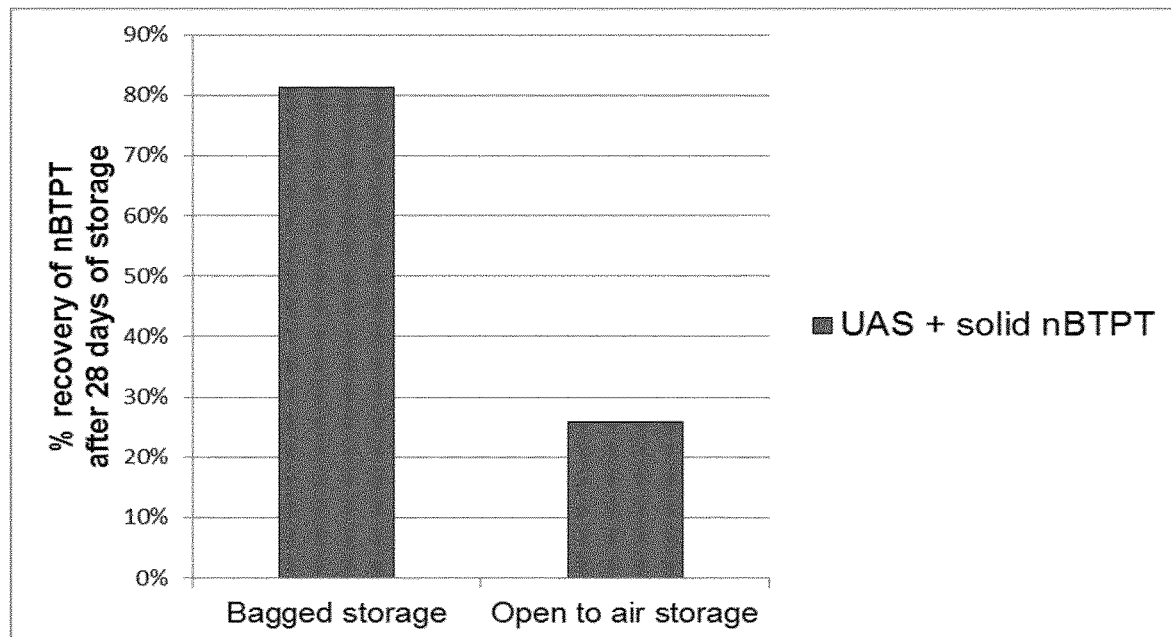
FIG. 7. Stability of solid nBTPT (500 ppm) on particulate UAS: bagged versus open to air storage—% recovery of nBTPT after 28 days of storage at room temperature (20-25° C.).

FIG. 7 shows the stability of solid nBTPT on UAS when stored in bags versus open to air storage. The recovery of nBTPT after 28 days of storage at room temperature (20-25° C.) is presented. The graph shows clearly the beneficial effect of bagged storage of the material on the stability of nBTPT on UAS in contrast when storage was done open to air.

Example 6

This example shows the beneficial effect of the combinations of all measures a), b) and c) on the stability of nBTPT on UAS.

Figure 8:
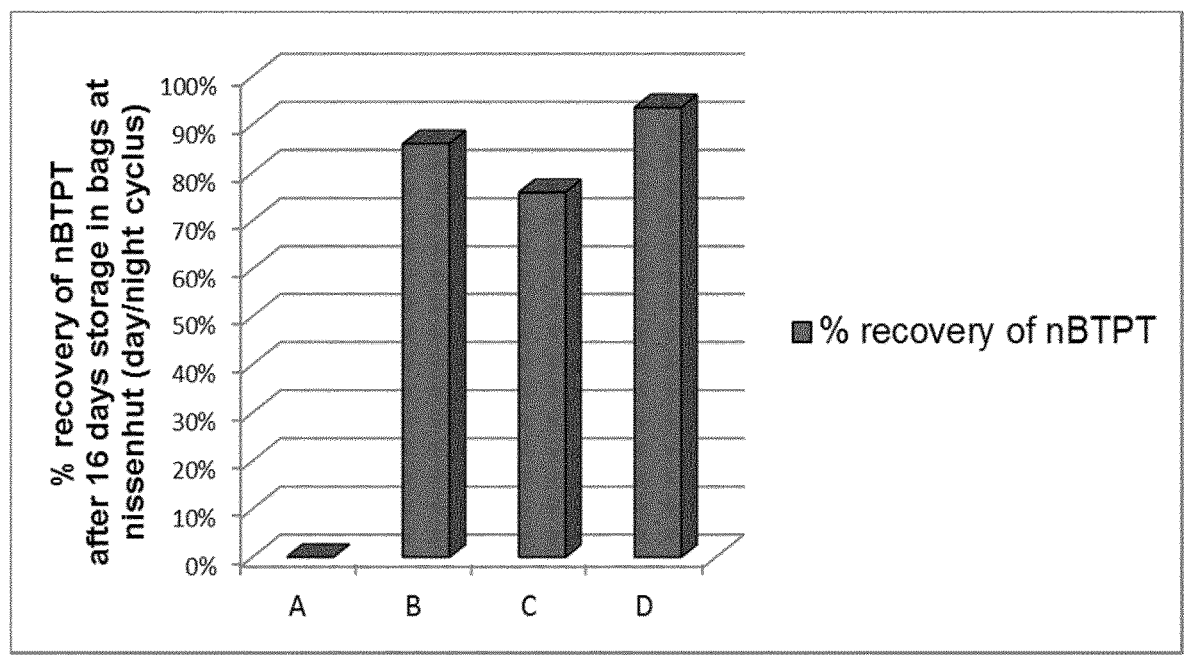
FIG. 8. Stability of nBTPT (500 ppm) on particulate UAS—% recovery of nBTPT after 16 days of storage in bags at nissenhut (day/night cycle 16-42° C./27-77% relative humidity).
A=UAS+500 ppm nBTPT as Agrotain® Ultra;
B=UAS+500 ppm nBTPT as Agrotain® Ultra+2650 ppm CaO;
C=UAS+500 ppm nBTPT powder;
D=UAS+500 ppm nBTPT powder+2650 ppm CaO.

FIG. 8 shows the stability of nBTPT on UAS with or without the addition of alkaline inorganic compound calcium oxide and with or without the application of nBTPT in solid particulate form. The recovery of nBTPT after 16 days of storage in bags at nissenhut (day/night cycle 16-42° C./27-77% relative humidity) is presented. The graph shows clearly the beneficial effect on the stability of nBTPT (liquid and solid) on UAS of
  The addition of an alkaline or alkaline-forming inorganic or organic compound (A versus B, C versus D); and
  The addition of the urease inhibitor of the type phosphoric triamide is in a solid particulate form (A versus C, B versus D).

Figure 9:
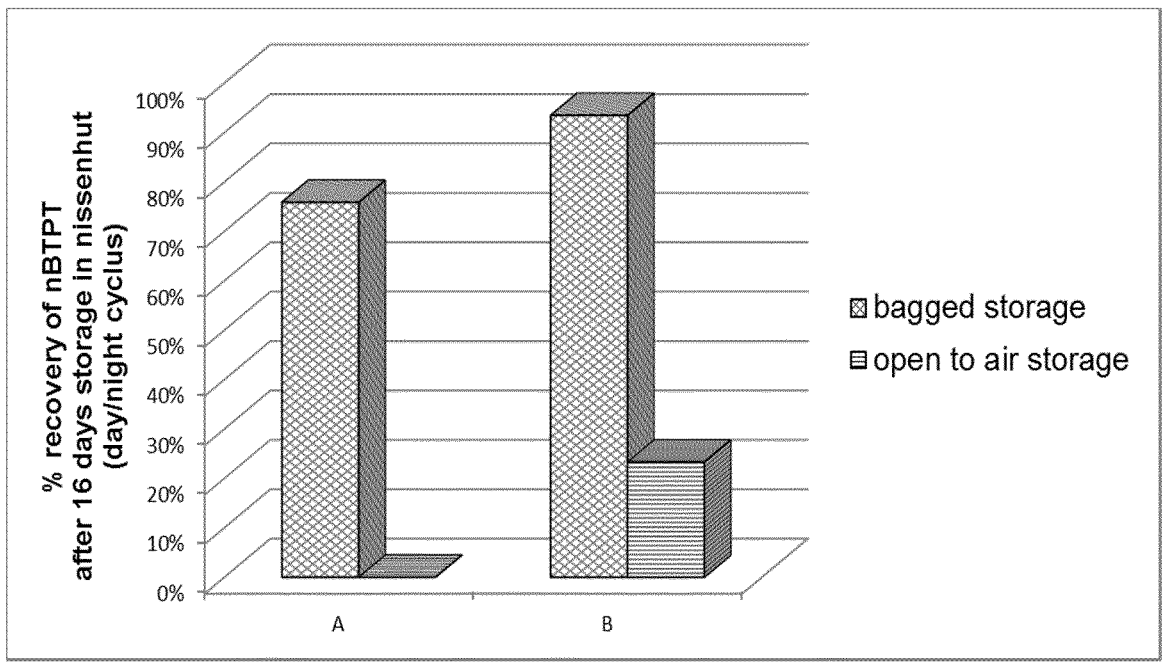
FIG. 9. Stability of nBTPT on particulate UAS: % recovery of nBTPT after 16 days of storage in nissenhut (day/night cycle 16-42° C./27-77% relative humidity).
A=UAS+500 ppm nBTPT powder;
B=UAS+500 ppm nBTPT powder+2650 ppm CaO FIG. 10. Stability of nBTPT on particulate UAS: % recovery of nBTPT after 7 days of storage in closed plastic containers with head space at 20° C./80% relative humidity.
A=uncoated UAS+500 ppm nBTPT as Agrotain® Ultra;
B=uncoated UAS+500 ppm nBTPT powder;
C=UAS coated with 4000 ppm NH-coating+500 ppm nBTPT as Agrotain® Ultra;
D=UAS coated with 4000 ppm NH-coating+500 ppm nBTPT powder.

FIG. 9 shows the stability of nBTPT on UAS with or without the addition of alkaline inorganic compound calcium oxide and with or without storage in bags without head space.

The recovery of nBTPT after 16 days of storage in nissenhut (day/night cycle 16-42° C./27-77% relative humidity) is presented.

The graph shows clearly the beneficial effect on the stability of nBTPT on UAS of
  The addition of an alkaline or alkaline-forming inorganic or organic compound (A versus B); and
  Storage of the material under bagged storage conditions without the presence of a head space.

Figure 10:
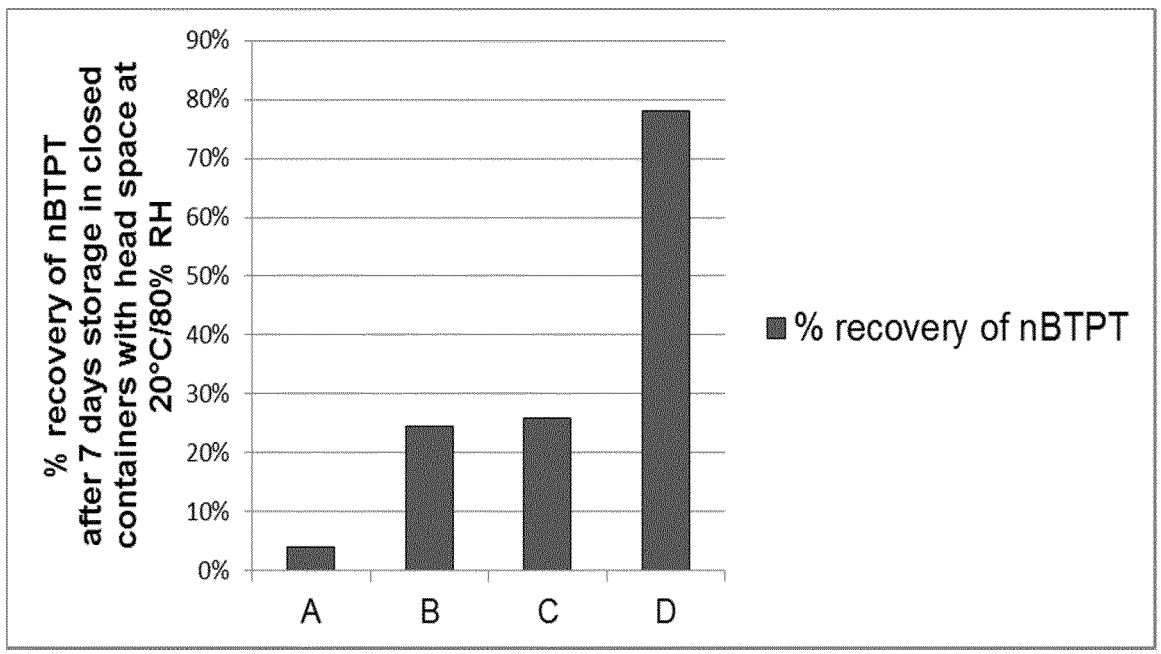

FIG. 10 shows the stability of nBTPT on UAS with or without the addition of a moisture repellent coating and with or without the application of nBTPT in solid particulate form. The recovery of nBTPT after 7 days of storage in closed plastic containers with head space at 20° C./80% relative humidity is presented.

The graph shows clearly the beneficial effect on the stability of nBTPT on UAS of
  The addition a moisture repellent coating; and
  The addition of the urease inhibitor of the type phosphoric triamide is in a solid particulate form.

Figure 11:
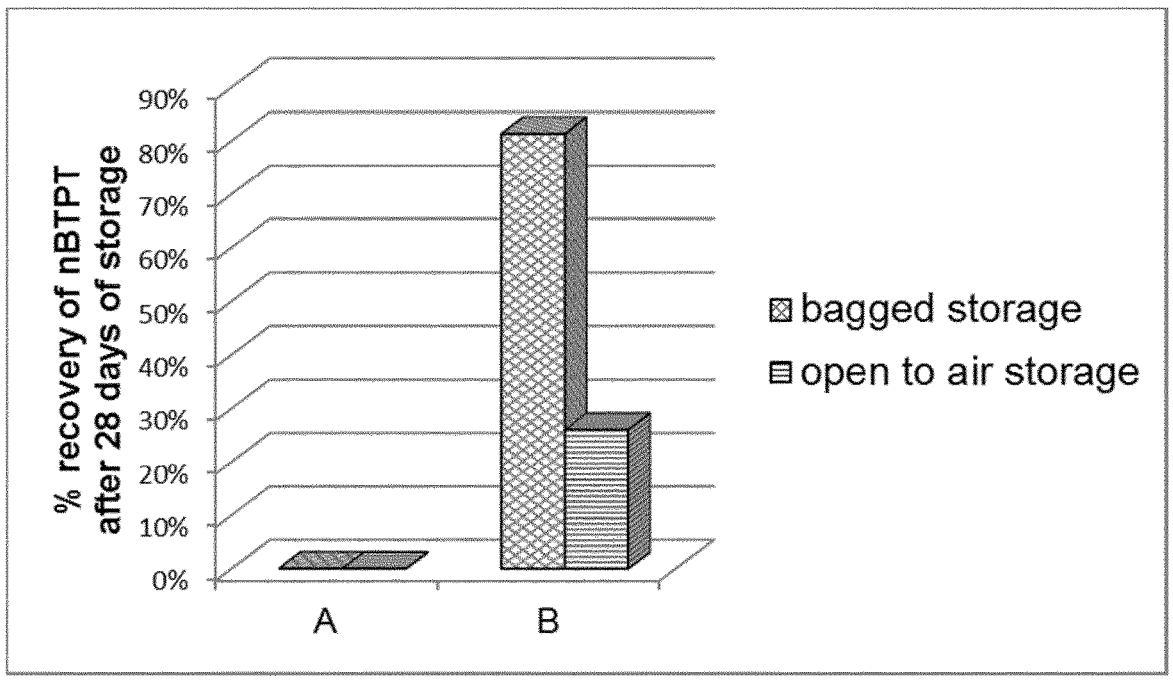
FIG. 11. Stability of nBTPT on particulate UAS: % recovery of nBTPT after 28 days of storage at room temperature (20-25° C.).
A=UAS+500 ppm nBTPT as Agrotain Ultra;
B=UAS+500 ppm nBTPT powder.

FIG. 11 shows the stability of nBTPT on UAS with or without storage in bags without head space and with or without the application of nBTPT in solid particulate form.

The recovery of nBTPT after 28 days of storage at room temperature (20-25° C.) is presented.

The graph shows clearly the beneficial effect on the stability of nBTPT on UAS of
  The addition of the urease inhibitor of the type phosphoric triamide is in a solid particulate form; and
  Storage of the material under bagged storage conditions without the presence of a head space.

Figure 12:
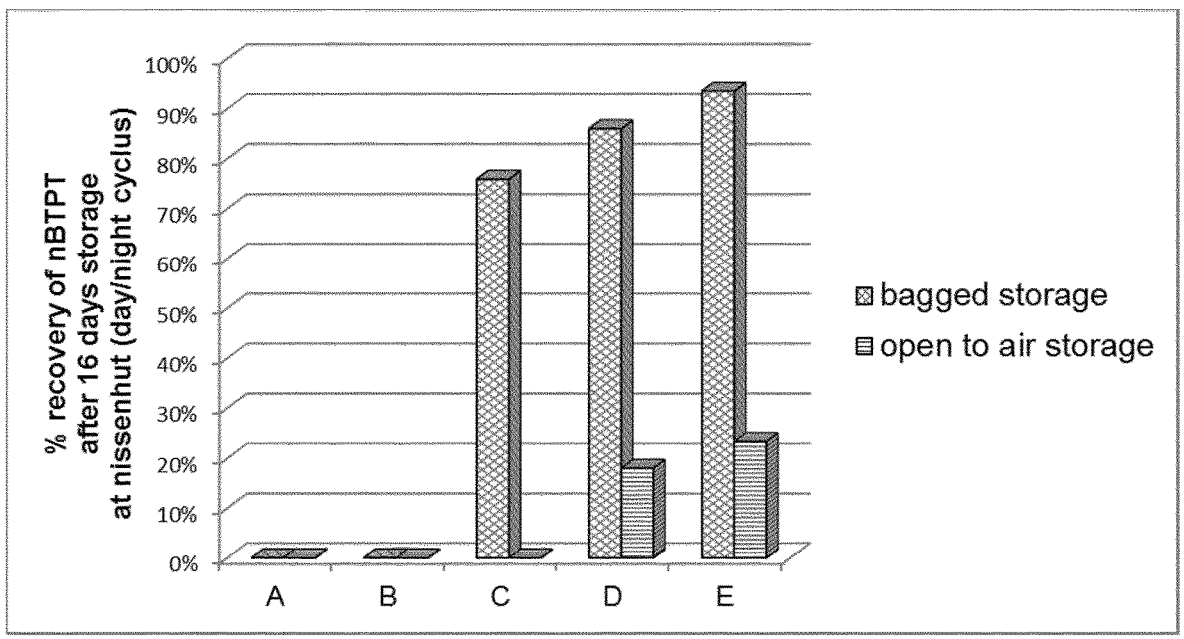
FIG. 12. Stability of nBTPT on particulate UAS—% recovery of nBTPT after 16 days of storage in nissenhut (day/night cycle 16-42° C./27-77% relative humidity).
A=uncoated UAS+500 ppm nBTPT as Agrotain® Ultra;
B=UAS coated with 900 ppm NH-coating+500 ppm nBTPT as Agrotain® Ultra;
C=UAS coated with 900 ppm NH-coating+500 ppm nBTPT powder;
D=UAS coated with 900 ppm NH-coating+500 ppm nBTPT as Agrotain® Ultra+2650 ppm CaO;
E=UAS coated with 900 ppm NH-coating+500 ppm nBTPT powder+2650 ppm CaO.

FIG. 12 shows the stability of nBTPT on UAS with or without the addition of alkaline inorganic compound calcium oxide, and with or without the application of nBTPT in solid particulate form, and with or without the addition of a moisture repellent coating, and with or without storage in bags without head space. The recovery of nBTPT after 16 days of storage in nissenhut (day/night cycle 16-42° C./27-77% relative humidity) is presented.

The graph shows clearly the beneficial effect on the stability of nBTPT on UAS of
  The addition an alkaline or alkaline-forming inorganic or organic compound; and
  The addition of the urease inhibitor of the type phosphoric triamide is in a solid particulate form; and
  The addition of a moisture repellent coating; and
  Storage of the material under bagged storage conditions without the presence of a head space.

In particular, a homogeneous, solid, particulate, urea ammonium sulphate-based composition comprising urea ammonium sulphate and a urease inhibitor of the type phosphoric triamide;
  wherein the urease inhibitor of the type phosphoric triamide is in liquid form, has a half-life time for nBTPT of only a few days when stored in bags at room temperature (20-25° C.);
  wherein the urease inhibitor of the type phosphoric triamide is in a solid particulate form, has a half-life time for nBTPT up to 4 months when stored in bags at room temperature (20-25° C.);
  wherein the urease inhibitor of the type phosphoric triamide is in a solid particulate form, and it comprises an alkaline or alkaline-forming inorganic or organic compound and a moisture repellent coating, has a half-life time for nBTPT up to over 6-12 months when stored in bags at room temperature (20-25° C.), Example 7

This example shows that a homogeneous, solid, particulate, urea ammonium sulphate-based composition comprising urea ammonium sulphate and a urease inhibitor of the type phosphoric triamide, wherein the urea ammonium sulphate-based composition is further characterized in that:
  a) it comprises one or more alkaline or alkaline-forming inorganic or organic compounds that is able to interact with ammonium sulphate; and/or
  b) the urease inhibitor of the type phosphoric triamide is in a solid particulate form; and/or
  c) an anti-caking and/or moisture repellent coating is applied onto the urea ammonium sulphate particulate material, has an efficient reduced amount of ammonia volatile losses on different soils (2 types shown) when compared to urea ammonium sulphate particulate material without the addition of a urease inhibitor of the type phosphoric triamide.

Figure 13:
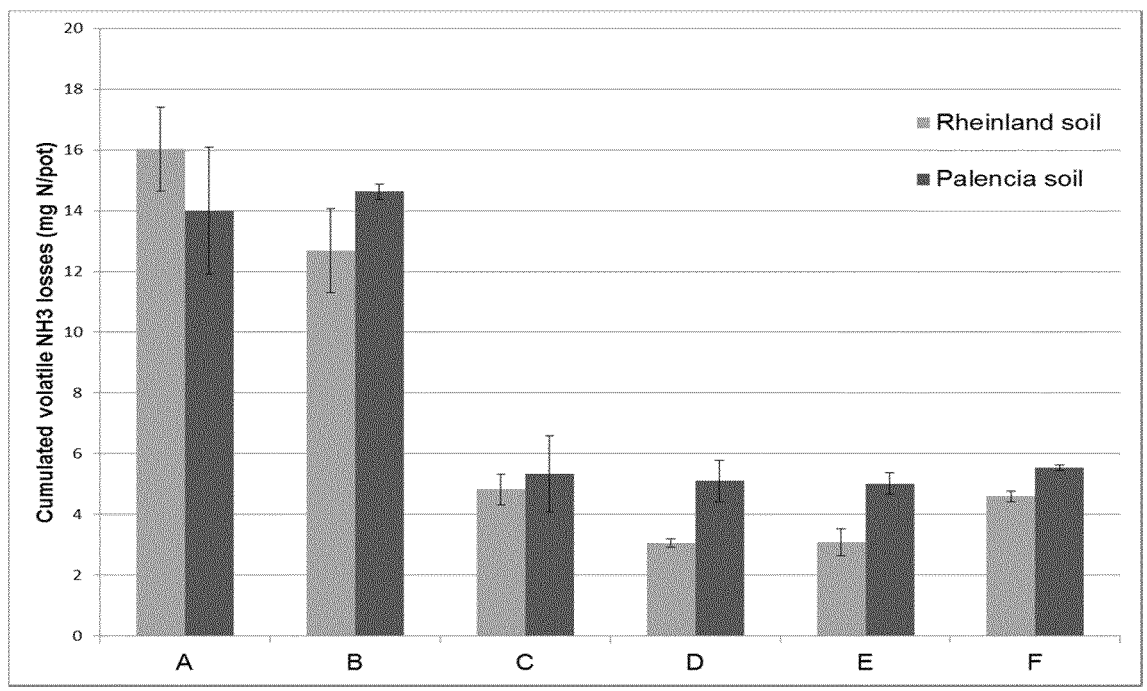
FIG. 13. Cumulated volatile ammonia losses (mg N/pot) on Rheinland soil (pH 6.5) and Palencia soil (pH 7.5). Experiments were done in three replicate (error bars).
A=urea;
B=UAS;
C=UAS+430 ppm nBTPT powder;
D=UAS+2350 ppm rapeseed oil+420 ppm nBTPT powder+2650 ppm CaO;
E=UAS+2350 ppm NH-coating+420 ppm nBTPT powder+2650 ppm CaO;
F=UAS+2350 ppm rapeseed oil+350 ppm nBTPT powder+ZnO (1% Zn).

FIG. 13 shows the cumulated volatile ammonia losses (mg N/pot) on Rheinland soil (pH 6.5) and Palencia soil (pH 7.5) of urea versus UAS with and without the addition of nBTPT and with and without the addition of calcium oxide or zinc oxide. The experiments were done in three replicate.

The invention claimed is:

1. A homogeneous, solid, particulate, urea ammonium sulphate-based composition comprising urea ammonium sulphate and a urease inhibitor of the type phosphoric triamide, wherein the urea ammonium sulphate-based composition is further characterized in that the following measure a) applies:
  a) it comprises from 0.02 to 1 weight %, relative to the total weight of the composition, of one or more alkaline or alkaline-forming inorganic compounds that is able to interact with ammonium sulphate, wherein the alkaline or alkaline-forming inorganic compound is selected from the group consisting of calcium oxide, magnesium oxide and calcium carbonate, or mixtures thereof;
  wherein the type phosphoric triamide is a compound of formula:

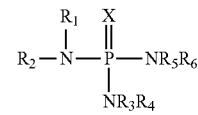

wherein:
  X is oxygen or sulphur;
  $R_1$ is alkyl, cycloalkenyl, aralkyl, aryl, alkenyl, alkynyl, or cycloalkyl;
  $R_2$ is hydrogen, alkyl, cycloalkenyl, aralkyl, aryl, alkenyl, alkynyl, or cycloalkyl, or
  $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
  $R_3$, $R_4$, $R_5$ and $R_6$ are individually hydrogen or alkyl having 1 to 6 carbon atoms; and
wherein the metal oxide is selected from the group consisting of calcium oxide, magnesium oxide, sodium oxide, aluminium oxide and barium oxide or a mixture thereof.

2. The urea ammonium sulphate-based composition according to claim 1, characterized in that:
  a) it comprises from 0.02 to 1 weight %, relative to the total weight of the composition, of one or more alkaline or alkaline-forming inorganic compounds that is able to interact with ammonium sulphate; and
  b) the urease inhibitor of the type phosphoric triamide is in a solid particulate form.

3. The urea ammonium sulphate-based composition according to claim 1, characterized in that:
  a) it comprises from 0.02 to 1 weight %, relative to the total weight of the composition, of one or more alkaline or alkaline-forming inorganic compounds that is able to interact with ammonium sulphate; and
  b) a moisture repellent coating is applied onto the urea ammonium sulphate particulate material.

4. The urea ammonium sulphate-based composition according to claim 1, characterized in that:
   a) it comprises from 0.02 to 1 weight %, relative to the total weight of the composition, of one or more alkaline or alkaline-forming inorganic compounds that is able to interact with ammonium sulphate; and
   b) the urease inhibitor of the type phosphoric triamide is in a solid particulate form; and
   c) a moisture repellent coating is applied onto the urea ammonium sulphate particulate material.

5. The urea ammonium sulphate-based composition according to claim 1, wherein the urease inhibitor is N-(n-butyl) thiophosphoric triamide (nBTPT).

6. The urea ammonium sulphate-based composition according to claim 1, wherein the urease inhibitor is present at a level of 0.02 to 1 weight %.

7. The urea ammonium sulphate-based composition according to claim 1, wherein the weight ratio of urease inhibitor of the type phosphoric triamide to one or more alkaline or alkaline-forming inorganic compounds that is able to interact with ammonium sulphate in the compositions according to the invention ranges from 1:20 to 1:1.

8. The urea ammonium sulphate-based composition according to claim 1, wherein the urease inhibitor is in solid particulate form.

9. The urea ammonium sulphate-based composition according to claim 1, wherein the urea ammonium sulphate-based composition is bagged without the presence of a head space.

10. The urea ammonium sulphate-based composition according to claim 1, wherein the urea ammonium sulphate-based composition comprises 50-100 weight % of UAS.

11. The urea ammonium sulphate-based composition according to claim 10, wherein the UAS is a co-granulated material, wherein ammonia is neutralized to form ammonium sulphate (AS) in the urea melt or solution to produce UAS.

12. The urea ammonium sulphate-based composition according to claim 11, wherein the composition contains from about 0.1 to 60 weight % of ammonium sulphate.

13. A method for the manufacture of a homogeneous, solid, particulate, urea ammonium sulphate-based composition according to claim 1, the method comprising the steps of:
   1) providing a urea ammonium sulphate material;
   2) adding from 0.02 to 1 weight %, relative to the total weight of the composition, of one or more alkaline or alkaline-forming inorganic compounds that is able to interact with ammonium sulphate, wherein the alkaline or alkaline-forming inorganic compound is selected from the group consisting of calcium oxide, magnesium oxide and calcium carbonate, or mixtures thereof;
   3) adding a urease inhibitor in solid particulate or liquid form; and
   4) optionally, applying a coating that is able to increase at least the water repellence and/or anticaking properties of urea ammonium sulphate;
   wherein the steps 2), 3) and 4) can be interchanged or wherein steps 2), 3) and 4) can be performed simultaneously; and
   wherein the metal oxide is selected from the group consisting of calcium oxide, magnesium oxide, sodium oxide, aluminium oxide and barium oxide or a mixture thereof.

14. Method for improving the stability of a urease inhibitor of the type phosphoric triamide in an urea ammonium sulphate-based composition comprising urea ammonium sulphate and said urease inhibitor, by one or more of the following measures:
   a) addition to the composition of from 0.02 to 1 weight %, relative to the total weight of the composition, of one or more alkaline or alkaline-forming inorganic compounds that is able to interact with ammonium sulphate, wherein the alkaline or alkaline-forming inorganic compound is selected from the group consisting of calcium oxide, magnesium oxide and calcium carbonate, or mixtures thereof;
   b) selection of a urease inhibitor of the type phosphoric triamide which is in a solid particulate form; or
   c) application of an anticaking and/or moisture repellent coating onto the particulate urea ammonium sulphate material:
wherein the type phosphoric triamide is a compound of formula:

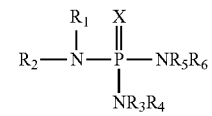

wherein:
   X is oxygen or sulphur;
   $R_1$ is alkyl, cycloalkenyl, aralkyl, aryl, alkenyl, alkynyl, or cycloalkyl;
   $R_2$ is hydrogen, alkyl, cycloalkenyl, aralkyl, aryl, alkenyl, alkynyl, or cycloalkyl, or
   $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
   $R_3$, $R_4$, $R_5$ and $R_6$ are individually hydrogen or alkyl having 1 to 6 carbon atoms; and
wherein the metal oxide is selected from the group consisting of calcium oxide, magnesium oxide, sodium oxide, aluminium oxide and barium oxide or a mixture thereof.

* * * * *

UNITED STATES PATENT AND TRADEMARK OFFICE
CERTIFICATE OF CORRECTION

PATENT NO. : 10,626,058 B2  
APPLICATION NO. : 15/754312  
DATED : April 21, 2020  
INVENTOR(S) : Filip Colpaert et al.

Page 1 of 1

It is certified that error appears in the above-identified patent and that said Letters Patent is hereby corrected as shown below:

In the Claims

In Claim 1, Column 16, Lines 48-51, In Claim 13, Column 18, Lines 6-10, and In Claim 14, Column 18, Lines 50-53, delete:
"; and
wherein the metal oxide is selected from the group consisting of calcium oxide, magnesium oxide, sodium oxide, aluminium oxide and barium oxide or a mixture thereof"

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*